Dec. 3, 1968  P. J. IMSE  3,414,034
LOCK RING FOR THREADED MEMBERS
Filed May 23, 1966

INVENTOR.
PHILIP J. IMSE
BY
Sughrue, Rothwell, Mion, Zinn & Macpeak
ATTORNEYS

United States Patent Office 3,414,034
Patented Dec. 3, 1968

3,414,034
LOCK RING FOR THREADED MEMBERS
Philip J. Imse, Wauwatosa, Wis., assignor to Rex Chainbelt Inc., Milwaukee, Wis., a corporation of Wisconsin
Filed May 23, 1966, Ser. No. 552,049
1 Claim. (Cl. 151—7)

ABSTRACT OF THE DISCLOSURE

A plastic split lock ring having a rectangular cross-section seated within a recess in a threaded shaft and being capable of axial and circumferential expansion upon engagement by a cooperating threaded nut.

---

This invention relates to improvements in the art of locking threaded members, and particularly to a deformable split ring of a material having plastic properties positioned in an annular recess on an inner threaded member or shaft for frictionally holding and thereby locking an outer threaded member or nut on the inner member.

Various forms of locking devices for threaded members are known, including those which use deformable plastic material to perform the locking function. Commonly, however, the deformable plastic material is cast integral with one of the threaded members, usually in the outer member or nut. Also known in the art are plastic plugs, as distinguished from annular members, cast integrally with one of the members for locking purposes.

One of the deficiencies of a plastic locking ring cast integrally with one of the locking members is that after repeated uses the locking function has deteriorated. That is, a non-removable locking ring determines the usefulness of the entire threaded part since the locking ring cannot be replaced without replacing the entire part. This may not be much of a problem with a throwaway nut, but if the part is a more expensive machined nut or shaft, the problems becomes more acute. Also, a cast plug of plastic material used for locking purposes is not nearly as efficient as an annular member and further, it does not provide a moisture barrier along the mating threads.

The lock ring of this invention is formed from a material having resilient plastic properties and is particularly adapted to be utilized on an inner threaded member such as a shaft to lock an outer threaded member such as a nut thereon, while providing a mositure barrier and also to be replaceable if and when desired. In order to accommodate the ring in an annular recess on the inner member the ring is split for insertion and removal purposes. The top of the ring extends to the pitch line of the threads of the inner member and upon deformation the ring expands axially to lock itself in the annular groove and radially to enter the spaces within the threads of the outer threaded member to frictionally secure the two parts rotationally.

Objects of the invention will be pointed out in the following description and claim and illustrated in the accompanying drawings, which disclose by way of example, the principle of the invention and the best mode which has been contemplated of applying that principle.

Figure 1:
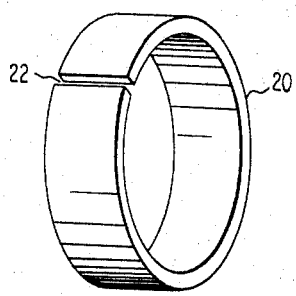
FIGURE 1 is a perspective view of the lock ring of this invention.
Figure 2:
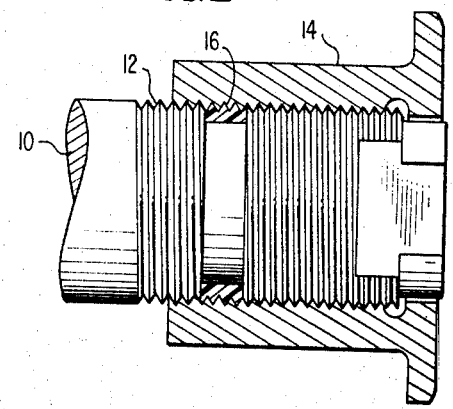
FIG. 2 is a longitudinal sectional view of the lock ring of FIGURE 1 as applied to an inner threaded member of the lock ring and outer threaded member for relative rotation of movement.
Figure 3:
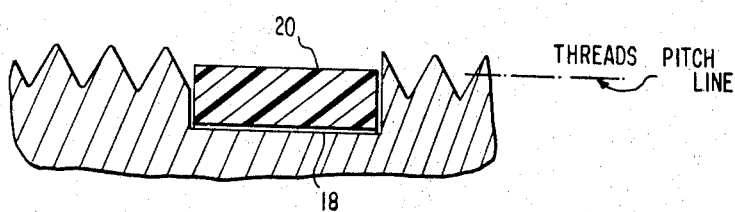
Figure 4:
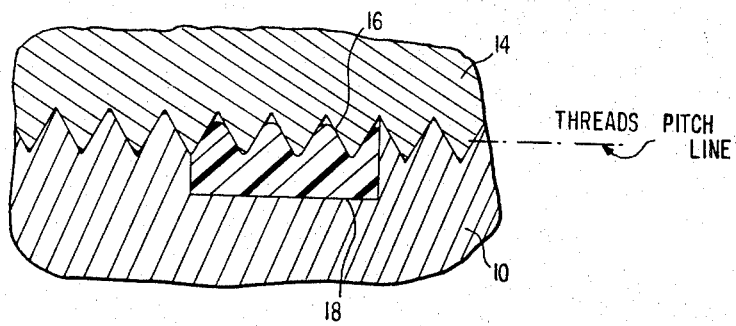

FIG. 3 is an enlarged and detailed longitudinal sectional view showing the lock ring of this invention when it has been first applied to the inner threaded member before being deformed by the outer threaded member; and FIG. 4 is an enlarged detailed longitudinal sectional view similar to FIG. 3 showing the lock ring of this invention performing its locking function after it has been deformed by the outer threaded member.

Referring to the drawing, an inner member of shaft 10 has a portion with threads 12 thereon. An outer threaded member or nut 14 has inner thread 16 formed therein for cooperation with threads 12.

The inner member of shaft 10 has an annular recess 18 formed therein. This recess has relatively "square" sides and as shown is intermediate the threaded portion but it may be adjacent the end of the threaded portion. A deformable lock ring 20 of a material having resilient plastic properties, such as nylon, is of sufficient width to fit in recess 18 with a small axial clearance for ease of insertion and a sufficient thickness to fit in recess 18 with its outer surface extending to the pitch line of the threads as shown in FIG. 3. The lock ring 20 has an axial length which is at least three times its radial thickness. The lock ring 20 is split at 22 in order that it may be inserted over the threads which extend to the end of the shaft 10 and so that it may be removable.

FIG. 4 shows the lock ring 20 after it has been deformed by thread 16 of member 14 threaded thereover. It is noted that alternate portions of the lock ring are compressed radially inwardly and are extruded radially outwardly into the space between thread 16. Such compression causes the lock ring to be expanded axially to bind itself against the ends of the recess 18 and also to be expanded circumferentially. The split ends 22 are spaced when the ring is seated in recess 18 to allow such circumferential as well as axial expansion. Preferably the split ends should abut each other when the lock ring is fully compressed by the threads. However, even where a small clearance remains, the lock ring forms an effective moisture barrier along the threads.

It has been found in practice that the lock ring provides a locking function even after repeated uses, that is, even after the nut 14 has been removed and replaced a number of times, and also functions as a moisture barrier preventing the travel of moisture along the mating threads 12 and 16. Since the ring is not permanently placed in the groove 18 however, it may be removed when the nut 14 is removed and a fresh lock ring placed in the groove so that the ring will present a fresh deformable surface for locking purposes.

While the invention has been particularly shown and thereof, it will be understood by those skilled in the art described with reference to a preferred embodiment that various changes in form and details may be made therein without departing from the spirit and scope of the invention.

I claim:

1. In combination with cooperating rating inner and outer members having outer and inner mating threads, means for frictionally locking said members against relative rotation and providing a mositure barrier between said members, said means comprising a removable, resilient synthetic plastic split lock ring being substantially rectangular in cross-section and being loosely disposed in an annular recess formed in one of said members intermediate the threaded ends thereof, said recess being substantially rectangular in cross-section, said lock ring having an axial length at least three times the radial thickness thereof, said recess having an axial length slightly greater than the axial length of said lock ring, said lock ring projecting approximately to the pitch line of the threads of the member carrying it, said lock ring being further provided with a substantial gap between the split ends thereof whereby upon engagement of said inner and outer members, said lock ring is expanded axially to frictionally engage the end walls of said groove and is further expanded radially and circumferentially, the volume of said lock ring being less than that of the cavity between said recess and the threads on the other of said members whereby said radial expansion is insufficient to completely fill the voids between the lock ring and the grooves of the adjacent threaded member, said circumferential expansion serving to cause said split ends to substantially close said gap therebetween such that a substantially fluid impervious barrier is formed annularly across said ring.

References Cited

UNITED STATES PATENTS

| 2,506,477 | 5/1950 | Warren | 151—7 |
| 2,980,451 | 4/1961 | Taylor et al. | 285—332.3 |
| 3,144,066 | 8/1964 | Van Hecke | 151—7 |
| 3,280,873 | 10/1966 | Fisher | 151—7 |

CARL W. TOMLIN, *Primary Examiner.*

RAMON S. BRITTS, *Assistant Examiner.*